UNITED STATES PATENT OFFICE.

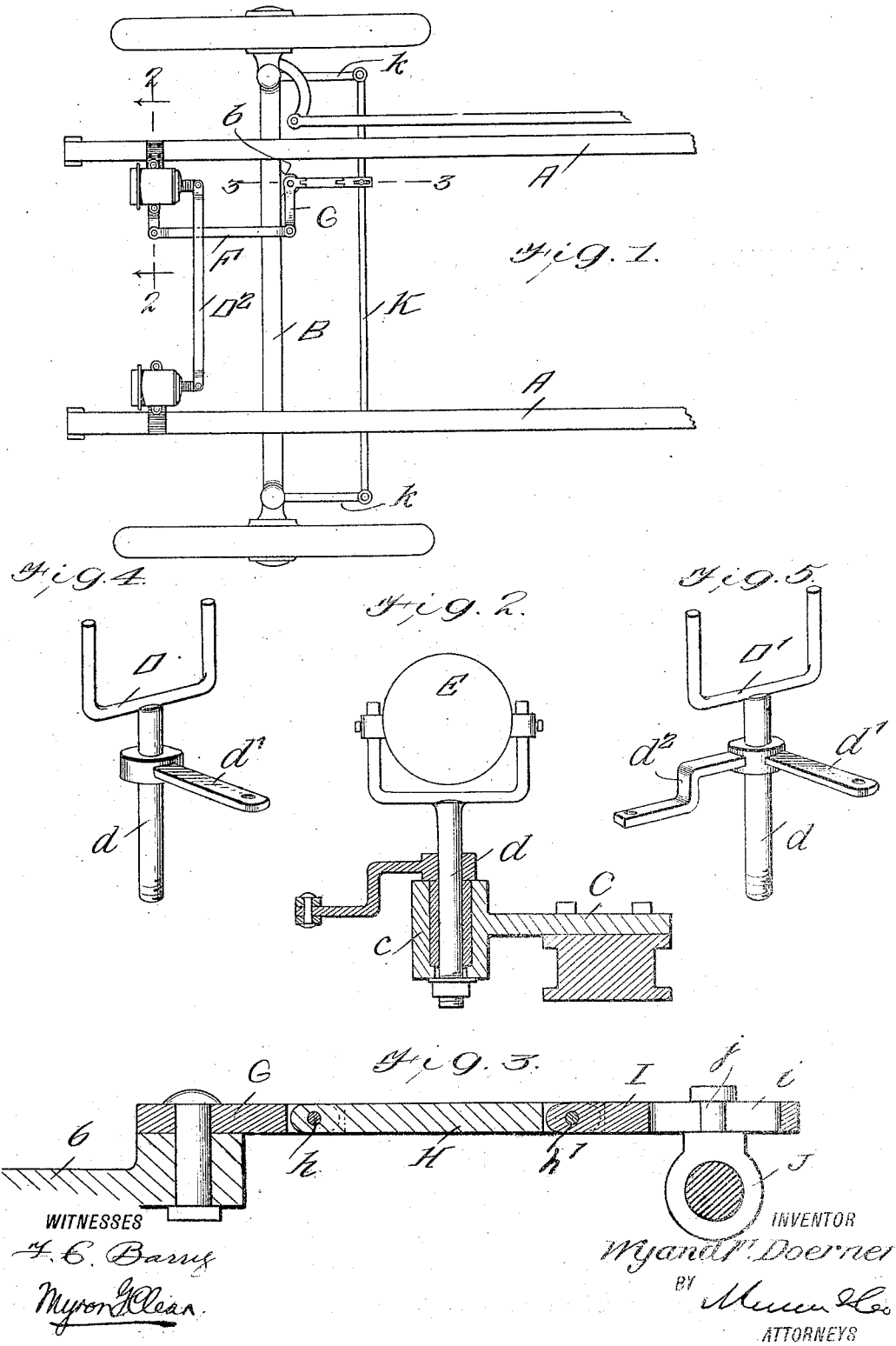

WYAND FRANCIS DOERNER, OF CUMBERLAND, MARYLAND, ASSIGNOR OF ONE-HALF TO FRANCIS JOSEPH GLICK, OF CUMBERLAND, MARYLAND.

AUTOMOBILE-LAMP.

1,083,733.

Specification of Letters Patent.

Patented Jan. 6, 1914.

Application filed September 27, 1913. Serial No. 792,226.

*To all whom it may concern:*

Be it known that I, WYAND F. DOERNER, a citizen of the United States, and a resident of Cumberland, in the county of Allegany and State of Maryland, have made certain new and useful Improvements in Automobile-Lamps, of which the following is a specification.

My present invention relates to automobile lamps, and particularly to that character of lamps and their attachments by which the lamps are caused to turn on vertical pivots for the purpose of following the direction of turning movement of the machine, connections between the lamps and the steering gear being had for this purpose, and the object of my invention is to provide simple and effective connections by which the vertical vibratory movement of the axle and steering connections is absorbed and prevented from communication to the lamps through their turning arrangements.

In the accompanying drawing which illustrates my invention, Figure 1 is a plan view of the forward portion of the frame of an automobile provided with my improvements. Fig. 2 is a vertical transverse section through one of the lamp brackets, taken substantially on line 2—2 of Fig. 1. Fig. 3 is a vertical longitudinal section taken through a portion of the connections substantially on line 3—3 of Fig. 1. Fig. 4 is a detail perspective view of one of the lamp brackets removed, and Fig. 5 is a similar view of the other lamp bracket removed.

Referring now to these figures, A indicates the longitudinal frame members of a machine, to the forward portions of which in front of the front axle B are secured the outer ends of inwardly projecting lamp supports C, at the inner ends of which are vertical tubular portions $c$, through which the depending stems $d$ of the lamp brackets D and D', clearly shown in Figs. 4 and 5, are journaled, the upper portions of these lamp brackets being substantially U-shaped to receive the lamps E. Each of the lamp brackets D and D' is also provided with a rearwardly projecting arm $d'$ and these arms are connected by a rod $D^2$ in order that movement of one lamp upon its stem $d$ will be communicated to the other lamp. The bracket D' is also provided with a laterally and inwardly projecting arm $d^2$, and this arm is pivotally connected by means of a link F to the laterally projecting arm of a bell crank lever G pivotally supported upon a rearwardly projecting lug $b$ of the front axle B, the rearwardly projecting arm of this bell crank lever being bifurcated to receive the forward reduced end of a connecting arm H. The forward end of arm H and the bifurcated end of the rearwardly projecting arm of bell crank lever G are pivotally connected by a horizontal pin $h$, and the rear end of connecting arm H is bifurcated to receive the forward reduced end of a slotted arm I, which forward end is connected to arm H, by a horizontal pivot pin $h'$. The longitudinal slot $i$ of arm I receives the headed pin $j$ of a collar J, shrunk or otherwise suitably connected upon the connecting link K, which extends parallel with the front axle and axle B, and connects the steering arms $k$ of the wheels. Thus, when the wheels are turned, the steering link K is shifted in the direction of its length and in such movement motion will be communicated to the bell crank lever G, through the slotted arm I and connecting arm H and from the bell crank lever G, will be communicated to the pivoted lamps through the connecting link F and the connections between the lamps. The steering link K being below the vehicle springs will, however, vibrate with respect to the frame of the car whenever the wheels pass over uneven ground, and it may be readily seen that this vertical vibratory movement between the parts will be absorbed by means of the pivots $h$ and $h'$ connecting the arm H with the bell crank lever G and the slotted arm I, by virtue of the fact that the slotted arm I is permitted longitudinal movement with respect to the collar J through the pin and slot connection between these parts. I am thus enabled to communicate to the lamps proper movement, in order to follow the direction of movement of the machine, and at the same time eliminate all vibratory movement due to the passage of the machine over uneven ground, which would otherwise materially detract from the effective operation of the lamps.

I claim:—

In a mechanism of the character described, the combination with automobile lamps, brackets rotatably supported upon the frame of the machine and upon which the lamps are mounted to turn, connections between the lamps for equalizing their turning movement, a bell crank lever mounted on the frame of the machine and connected with one of the lamps, a collar rigidly mounted on the steering link and provided with a vertically projecting pin, an arm provided with a slot in which the said pin is movable, and a connecting arm having horizontal pivot pins pivotally connecting its forward end to the bell crank lever and its rear end to said slotted arm, all for the purpose described.

WYAND FRANCIS DOERNER.

Witnesses:
A. E. MAURY,
ANNA KRAFT.

Copies of this patent may be obtained for five cents each, by addressing the "Commissioner of Patents, Washington, D. C."